Aug. 21, 1962     P. A. KENDALL     3,049,982
HIGH SPEED SHUTTER
Filed July 20, 1960
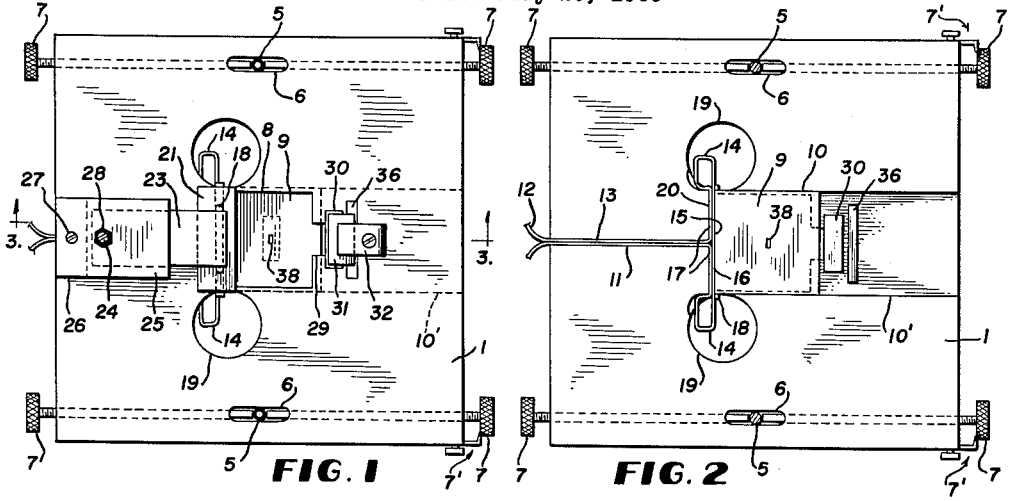
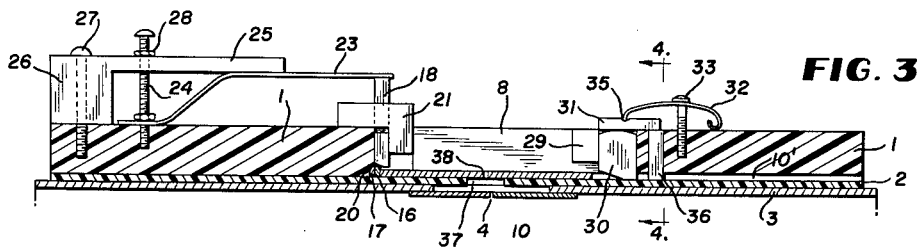
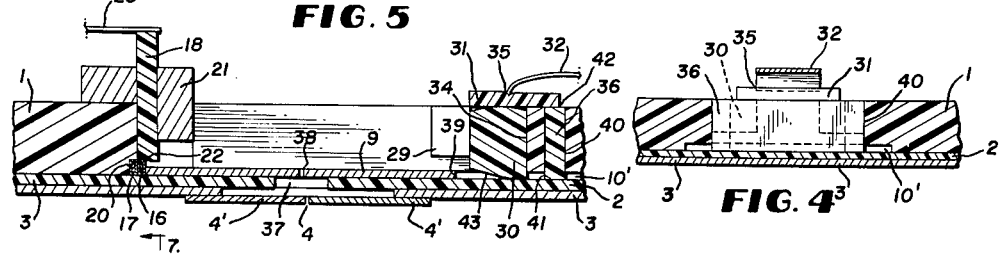
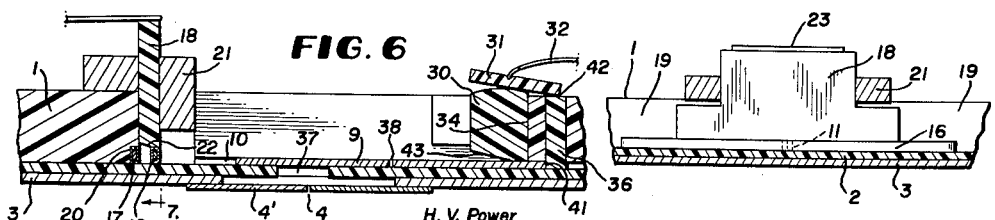
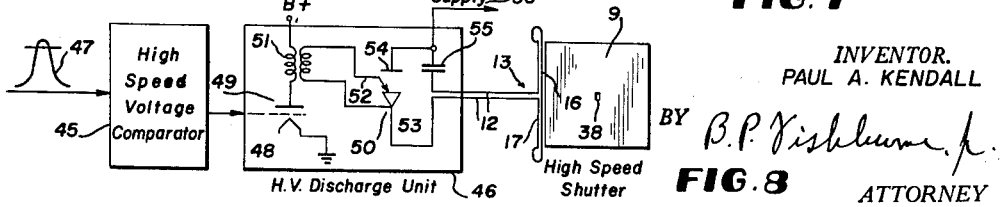
INVENTOR.
PAUL A. KENDALL
BY B. P. Fishburn, Jr.
ATTORNEY

United States Patent Office 3,049,982
Patented Aug. 21, 1962

3,049,982
HIGH SPEED SHUTTER
Paul A. Kendall, 4615 Saul Road, Kensington, Md.
Filed July 20, 1960, Ser. No. 44,189
13 Claims. (Cl. 95—55)

My invention relates broadly to shutters and more particularly to a high speed shutter mechanism for operating in the microsecond range which is actuated by mechanically harnessed force of opposing magnetic fields.

One of the objects of my invention is to provide a construction of high speed shutter, which operates in the sub-millisecond range, which is simple in design and economical to manufacture.

Another object of my invention is to provide a construction of electro-mechanical shutter having few movable parts, and in which all movable parts are constructed of low mass material, thus enabling high acceleration of a movable shutter plate.

A further object of my invention is to provide a construction of high speed electro-mechanical shutter in which the shutter aperture is opened and closed during operation, that is, the shutter operation provides a complete high speed gating action.

Still another object of my invention is to provide a high speed shutter construction capable of accurate and reliable high speed control and successive use of the low mass shutter plate.

A still further object of my invention is to provide a high speed shutter construction with a substantially free-moving shutter plate and an arresting mechanism of simple construction for effectively arresting the forward motion of the free-moving shutter plate while traveling at high speeds.

Other and further objects of the high speed shutter mechanism of my invention are set forth more fully in the specification hereinafter following by reference to the accompanying drawings, in which:

FIG. 1 is a top plan view of the high speed electro-mechanical shutter of my invention;

FIG. 2 is a bottom plan view of the electro-mechanical shutter of my invention, the bottom plate being removed to more clearly show the various components thereof;

FIG. 3 is an enlarged cross-sectional view taken substantially along line 3—3 of FIG. 1;

FIG. 4 is a transverse sectional view of a fragmentary portion of my electro-mechanical shutter, taken substantially along line 4—4 of FIG. 3, and particularly showing the manner in which the shutter arresting block extends in the path of the shutter plate;

FIG. 5 is an enlarged cross-sectional view of a fragmentary portion of FIG. 3 showing the shutter actuating wires and shutter plate in the pre-energized position;

FIG. 6 is a cross-sectional view similar to FIG. 5, but showing the shutter actuating wires in the post-energized position and the shutter plate in the extremity of its travel;

FIG. 7 is a partial transverse sectional view taken substantially along line 7—7 of FIG. 6; and FIG. 8 is a diagrammatic view of the electrical circuit controlling the electro-mechanical shutter of my invention.

My invention is directed to an electro-mechanical shutter mechanism with a sub-millisecond open time, designed for accurately controlling the recording period of a spectrograph or other similar type equipment or for use where conditions require a reliable instantaneous controlled opening shutter with a sub-millisecond open time. By mechanically harnessing the magnetic fields set up by a high current surge through a wire loop having two portions in close proximity to each other an apertured movable shutter plate is propelled forwardly, passing the shutter aperture into and out of registration with the spectrograph slit (or slit provided by similar equipment), allowing light rays to pass therethrough for a small increment of time, to provide an opening and closing shutter condition having a sub-millisecond open time. The open time of the shutter can be varied through the approximate range of 1 to 1000 microseconds, with a minimum time to open the shutter of approximately 7 microseconds, thus making possible effective time resolved spectrograms of dynamic emission phenomena. The lower end of the shutter open time range may be obtained with a shutter aperture width of approximately 0.001 inch.

Referring to the drawings in more detail, like reference numerals refer to similar members in the various figures.

Reference character 1 designates the main body member of my shutter while reference character 2 designates the shutter base plate which is mounted flush against face plate 3 of the spectrograph, providing spectrograph slit 4 defined by spectrograph jaws 4', and providing shutter mounting bolts 5.

Slots 6 are provided by the main shutter body member 1 and base plate 2 to receive shutter mounting bolts 5. A pair of shutter-positioning screws 7 are associated with each slot 6 to provide accurate alignment of the shutter mechanism with the spectrograph slit 4. Each pair of shutter-positioning screws 7 is screw-threadedly engaged by main shutter body member 1 and positioned to emerge into the slot 6, one on each side of a mounting bolt 5 and in abutment with the mounting bolt 5, such that by turning in on one adjusting screw 7 and backing off on the associated adjusting screw minute adjustments may be imparted to the positioning of the shutter mechanism. Suitable adjustment calibrations carried by the heads of adjusting screws 7 in conjunction with a pointer may be provided as indicated generally at 7' for aiding in minute shutter alignment adjustments. It is obvious from the construction shown that considerable latitude of movement can be imparted to the shutter mechanism main body member 1 by manipulation of the two pairs of adjusting screws as shown in FIG. 1.

The main shutter body member 1 is provided with a longitudinally extending rectangular channel, indicated at 8, which serves as a raceway for the freely movable untethered shutter plate 9, an access opening for resetting the shutter plate, and an opening through which the light rays may travel when the shutter is open. As shown more particularly in FIGS. 2 and 4 the edges of the rectangular channel 8 adjacent the base plate 2 are provided with recessed guide grooves, indicated at 10, for the movable shutter plate 9. The shutter guide grooves 10 extend beyond the cutout channel portion 8 to the edge of the main shutter body member to provide a recessed guiding raceway 10' along the bottom of the main shutter body member.

A recessed channel 11, shown more particularly in dotted lines in FIG. 7, is provided on the lower face of main body member 1 opposite the rectangular channel 8 and extending along the center axis of channel 8 for housing the strands of wire 12 which form the standard portion of the T-shaped actuating wire element 13. The T-shaped actuating wire element or actuator loop 13 is comprised of a single insulated wire of rectangular cross-section formed in the shape of a T, as shown in FIG. 2, such that the standard portion of the T consists of two portions of insulated wire 12 held in close proximity to each other in recessed channel 11, and the cross bar portion of the T-shaped element is comprised of the wire 12 bent back upon itself to form loops indicated at 14 on either end of the cross bar portion of the T-shaped element such that the cross bar portion 15 is comprised of a movable outer segment 16 and immovable inner segments 17 normally held in close proximity to each other by means of a seating block 18. Main body member 1 adjacent the interior end of rectangular channel 8 provides cutout portions indicated at 19 for the looped ends 14 of the cross bar portion 15 of the T-shaped actuating element 13. The interior end of rectangular channel 8 provides a flush recessed groove 20 for securely holding the immovable segments 17 of the T-shaped element cross bar portion 15.

Seating block 18, which is preferably constructed of plastics material or some other insulation material, as shown more particularly in FIGS. 5–7, is mounted in movable guided relation to main body member 1 by means of seating block guide member 21 which is securely mounted to main body member 1 by means of screws or some suitable bonding means. Seating block 18 is disposed in seating block guide member 21, such that it may move up and down in the vertical plane and is disposed such that it will provide a loading force, to the movable cross bar wire segment 16, which is perpendicular to the plane of travel of the wire segment. The lower end of the seating block, which rests only on the movable wire segment 16 of the T-shaped actuating wire element 13, as shown more particularly in FIGS. 5 and 6, is provided with an inclined surface indicated at 22 to assist in seating the movable wire segment 16 against the immovable wire segments 17. A downward force is imparted to seating block 18 by means of leaf spring 23, bearing on the top portion thereof, which is secured to main body member 1 by means of bolt 24, and a downward biasing force is imparted to leaf spring 23 by the arm portion 25 of the leaf spring back-up member 26, which is secured to main body member 1 by means of bolt 27, or other suitable bonding means, by tightening down on nut 28 on bolt 24 which extends through arm portion 25. The adjustment provided by nut 28, imparting downward pressure on arm portion 25 which in turn downwardly biases leaf spring 23, provides a variable spring force loading on the top portion of seating block 18. Sufficient frictional loading force is applied to movable wire segment 16 by seating block 18 and its associated spring mechanism (for example approximately 1 lb.) so that the wire segments 16 and 17 are aligned parallel and flush to each other.

The portion of the main shutter body 1 which forms the edge of rectangular channel 8 which lies opposite the T-shaped actuating wire element 13 is provided with an access slot 29 which communicates with a guide passage 34 formed through the main body member 1. A brakeshoe block 30 is movably disposed in guide passage 34. The lower end of the brakeshoe block is seated against the upper face of base plate 2 by arresting mechanism seating block 31 which is held in abutment with the upper portion of brakeshoe block 30 and the upper surface of main body member 1 by arresting mechanism leaf spring 32 adjustably secured to main body member 1 by means of bolt 33. The arresting mechanism seating block 31 is not secured to the main body member but is merely biased into frictional engagement therewith by means of leaf spring 32. The end of leaf spring 32 which contacts the upper surface of the arresting mechanism seating block 31 lies within a recess 35 formed within the upper surface thereof so that it cannot easily become dislodged therefrom.

The upper portion of brakeshoe block 30 which lies in abutting contact with the lower surface of arresting mechanism seating block 31 is provided with a curved surface, as shown more particularly in FIGS. 5 and 6, so that there is substantially a single point contact between the seating block and the brakeshoe block.

A shutter arresting block 36, disposed transversely to recessed guiding raceway 10' and disposed slightly behind the brakeshoe block, extends through a guide channel 40 formed through the main shutter member body 1 and extends into the guiding raceway 10' and into engagement with the top surface of base plate 2, such as to provide an abutment surface, indicated at 41, extending into the path of travel of shutter plate 9.

The shutter arresting block 36 is securely seated against base plate 2 by means of the lower edge of the arresting mechanism seating block as indicated at 42.

In the normal position the leaf spring 32 and seating block 31 bias the lower edge of brakeshoe 30 into abutment with the base plate 2 as shown in FIG. 5. The lower edge of the brake shoe block facing the shutter plate 9, provides an outwardly diverging beveled edge thereon for abutting contact with shutter plate 9 to enable shutter plate 9 to raise the brakeshoe block as the shutter plate is propelled into contact therewith.

The base plate or support 2 is preferably constructed of plastic or other suitable material and is preferably maintained as thin as possible to limit the undesirable effects caused by optical defraction of the light rays entering the spectrograph slit 4 from the shutter aperture 38. The spectrograph slit 4 is defined by the spectrograph jaws 4' movably mounted to the spectrograph face plate 3. The entire shutter mechanism with the exception of the leaf springs, screws, and actuating wire element may be constructed of plastics material. The shutter mechanism base plate 2 is provided with an opening indicated at 37 which is positioned over and in alignment with the spectrograph slit 4. It is preferred that the base plate opening 37 be of much larger area than the spectrograph slit 4 and the shutter aperture 38.

The shutter plate 9 is constructed of a high strength to weight ratio material, such as plastic, with a weight for example of 0.67 gram, and is free to travel over the surface of base plate 2 within the guide grooves 10 of rectangular channel 8 and the guide raceway 10'. The material from which the shutter plate is constructed must have a high, compression and impact strength so as to be able to withstand the extreme pressures imparted thereto during firing of the shutter. The low mass shutter 9 carries a narrow aperture therein, indicated at 38. To more fully appreciate the light chopping qualities obtainable with the shutter construction as taught by my invention, and to appreciate the dimensions of the apertures involved, for example, the aperture 38 can have dimensions such as 0.06 inch in width and 0.3 inch in length, while the spectrograph slit 4 may have a width of approximately 0.001 inch. In the normal position, segment 16 held firmly against the immovable segments 17, of the T-shaped actuating wire element 13, by seating block 18, one edge of the shutter plate is positioned directly in abutment with movable wire segment 16 as shown more particularly in FIG. 5. In the normal position thus described, the shutter aperture 38 overlies the base plate opening 37 and is positioned by means of the pairs of adjusting screws 7, such that the shutter aperture 38 is out of alignment with respect to the spectrograph slit 4 as shown more clearly in FIG. 5. With this arrangement the shutter is in the closed position and none of the light rays of the dynamic emission phenomena are permitted to enter the spectrograph.

When a large current surge is released into the T-shaped actuating wire element 13, the current flows through the wire segments 16 and 17 in opposite directions, thus setting up opposing magnetic fields about the wire segments causing the movable outer segment 16 of the T-shaped element 13 to instantaneously repel from the immovable wire segments 17, thus raising the seating block 18 and imparting an impulse of forward motion to the shutter plate 9 as outer segment 16 moves away from immovable segments 17. The mechanical propelling impulse of movable outer segment 16 lasts for about 30 micro-seconds, thus being in contact with the low mass shutter and providing accelerating force thereto for about 30 microseconds, after which period the shutter plate 9 moves forwardly as a relatively free propelled body. As the shutter plate is forwardly propelled the shutter aperture 38 moves into alignment with the many times narrower spectrograph slit 4, thus providing the light gating action, effectively causing an opening and closing shutter condition as the aperture 38 and slit 4 pass into and out of alignment or registration. The moving outer wire segment 16 repelled by inner wire segments 17 is quickly decelerated by the spring-loaded action of seating block 18 such that the movement of travel of segment 16 is normally limited to approximately less than 0.1 inch travel. This state is more clearly shown in FIG. 6.

After the spectrograph slit 4 is thus opened and closed the leading edge 39 of shutter plate 9 moves into collision contact with the inclined surface 43 of brakeshoe block 30, thus lifting the brakeshoe block against the biasing force of leaf spring 32. Since the leaf spring engages the arresting mechanism seating block 31 intermediate the edges thereof and between the edge contacting the top surface of shutter arresting block 36 and that part of the seating block in contact with brakeshoe block 30, as the brakeshoe block 30 is raised by the shutter plate 9, the seating block 31 is pivoted upwardly about the edge 42 against the biasing force of leaf spring 32. With this arrangement the pivot edge 42 of seating block 31 always applies a downward force to arresting block 36 to maintain the same in a seated position.

As the shutter plate 9 moves beneath the brakeshoe block, the brakeshoe block provides frictional drag along the top surface thereof to aid in decelerating the forward movement of the shutter plate. During this deceleration period of the shutter plate, the leading edge 39 comes into contact with abutment surface 41 of shutter arresting block 36. Upon contact therewith the shutter plate 9 has a tendency to rebound but is quickly brought to rest by the frictional drag provided on the top surface thereof by brakeshoe block 30, seating block 31, and biasing spring 32.

By way of illustration it has been computed that movable wire segment 16 imparts a maximum propelling force of approximately 100 to 650 lbs. to the back of a shutter plate 9 having an approximate weight of 0.67 gram, when a half-cycle current surge in the range of 7000 to 17,500 amperes is applied to the T-shaped actuating wire element 13. An initial D.C. voltage in the range of 2800 volts D.C. to 7000 volts D.C. is required at the capacitor feeding the T-shaped actuating wire element to provide the mentioned range of current surge pulse. For purposes of illustration, using the above shutter parameters with a shutter aperture width of approximately 0.06 inch and a spectrograph slit width of approximately 0.001 inch, the total open time of the shutter falls within the range of 70 to 600 microseconds with a minimum shutter opening time of 7 microseconds.

After the shutter mechanism is thus actuated the movable wire segment 16 must be manually reseated flush against immovable wire segments 17 and the shutter plate must be manually repositioned into abutting contact with movable wire segment 16 before the shutter mechanism is again operated. Channel 29 is provided in main body member 1 to provide access to shutter plate 9 for the purpose of repositioning the same to the normal state from an engaged position beneath the brakeshoe block 30. Each time the shutter mechanism is operated the looped ends 14 of the cross bar portion 15 of the T-shaped actuating wire element 13 act somewhat as hinges in allowing movable segment 16 to move out of engagement with immovable segments 17.

In FIG. 8 I have shown a schematic diagram of an electrical discharge circuit for supplying a heavy current surge pulse to the T-shaped actuating wire element 13 of the high speed shutter of my invention. The block diagram shown is comprised of a high speed voltage comparator circuit indicated at 45, and a high voltage discharge unit indicated at 46 which supplies the current surge actuating pulse to the T-shaped actuator wire element 13.

An input voltage analog indicated at 47, concurrent with the dynamic emission phenomena to be observed, is fed into the high speed voltage comparator 45 which picks off the input voltage at a preset voltage level and transmits a trigger pulse to the grid 48 of thyratron 49 in the high voltage discharge unit 46. The thyratron tube 49 acts as a power buffer stage between the high speed voltage comparator and the ignitron indicated at 50.

The trigger pulse from the high speed voltage comparator drives the thyratron grid 48 in a positive direction causing the tube to conduct. A pulse transformer 51, of approximately a 1:1 ratio, has its primary winding connected into the plate circuit of the thyratron for effective and reliable pulsing, or firing of the ignitron 50. The thyratron tube has its own power supply for supplying its necessary plate and biasing voltages. The plate of the thyratron is connected to the power supply through the primary winding of pulse transformer 51. The primary transformer winding in the thyratron plate circuit thus limits the maximum surge current supplied to the ignitron.

As shown, the secondary winding of pulse transformer 51 is connected directly across ignitor 52 and cathode 53 of the ignitron 50. The plate 54 of the ignitron is connected to one side of energy storage capacitor 55, and as indicated at 56, to a high voltage power supply. This high voltage power supply for example may supply voltages in the range of 0–12,000 volts and is used to charge the energy storage capacity 55. The opposite end of energy storage capacitor 55 is connected to one strand of wire 12 which forms the standard portion of the T-shaped actuating wire element and the other strand of wire 12 of the standard portion is connected to the cathode 53 of the ignitron.

When the thyratron 49 is triggered by the high speed voltage comparator 45 the secondary winding of pulse transformer 51 delivers a positive pulse of approximately 800 volts to the ignitor 52 to trigger the ignitron 50, which fires in approximately one microsecond. When the ignitron is triggered it acts as a high speed switch and switches the high voltage charge of the energy storage capacitor 54 through the T-shaped actuating wire element 13, thereby causing a heavy current surge through the wire element 13. The current waveform is a damped sinusoidal waveform lasting approximately $30 \times 10^{-6}$ seconds with a maximum half-cycle magnitude in the approximate range of 7000–17,500 amperes. The initial D.C. charge stored in energy storage capacitor 55 to produce such a current surge is in the approximate range of 2800–7000 volts D.C.

The high current surge through the cross bar portion of the T-shaped element 13 sets up strong opposing magnetic fields about the segments 16 and 17 due to current flow through these segments in opposite directions, and since segments 17 are held in an immovable position, the repulsion force between the segments causes segments 16 to be repulsed from segments 17; thus this mechanical harnessing of the magnetic fields causes shutter plate 9 to be propelled by the movable wire segment 16. Thus the force of the wires repelling from each other imparts a high speed impulse to the movable shutter plate.

The circuit shown in FIG. 8 illustrates one manner of providing a high current surge through the actuating wire element but it is to be understood that such a current surge can be controlled by other types of high discharge current switches, and produced by other types of pulse forming networks.

While I have described my invention in certain of its preferred embodiments, I realize that modifications may be made, and I desire that it be understood that no limitations upon my invention are intended other than those imposed by the scope of the appended claims.

What I claim as new and desire to secure by Letters Patent of the United States, is as follows:

1. A high speed shutter mechanism comprising relatively stationary support and guiding means, said support and guiding means having a light aperture, a freely movable shutter element engaging the support and guiding means for movement relative thereto and having a light aperture for substantially instant registration with the first-named light aperture during movement of the shutter element, an actuator loop for propelling the shutter element in one direction including opposed sides adapted to separate when a current surge is passed through the loop, one side of said loop disposed adjacent one end of the shutter element and free from attachment thereto, and the other side of said loop being arranged to be substantially stationary when a current surge is passed therethrough, electrical means for passing said current surge through the loop, and means to arrest movement of the shutter element when the same is propelled in one direction by said actuator loop.

2. A high speed shutter comprising relatively stationary support and guiding means having a light aperture, a freely movable shutter element engaging the support and guide means and having a light aperture for substantial instantaneous registration with the first-named light aperture during movement of the shutter element, an actuator loop including opposed sides adapted to separate when the loop is electrically energized, one side of said loop disposed in unattached engagement with one end of the shutter element to propel the shutter element in one direction, and the other side of the loop arranged to be substantially stationary, and means to energize said loop.

3. A high speed shutter mechanism comprising relatively stationary support and guiding means having a light aperture, a shutter element engaging the support and guide means and having a light aperture for substantial instantaneous registration with the first-named light aperture during movement of the shutter element, a current-conducting wire actuator comprising a first side portion, loops carried by the ends of said first side portion, second side portions connected with said loops and extending in axial alignment with each other and in side-by-side relation with said first side portion, the ends of said second side portions disposed normal thereto and extending into electrical connection with electrical means to pass a current surge therethrough, said first side portion adapted to separate from said second side portions when a current surge is passed through the current-conducting wire actuator, and said first side portion engageable with one end of said shutter element for imparting propelling movement thereto when a current surge is passed through the current-conducting wire actuator.

4. A high speed shutter mechanism comprising a high speed shutter element having a light aperture, means to support and guide the shutter element during movement of the latter and having a light aperture for substantial instantaneous registration with the light aperture of the shutter, a current-conducting wire actuator for the shutter element disposed near one end of the shutter element and unattached thereto and having opposed sides adapted to separate and propel said shutter element when said wire actuator is energized, one of said sides arranged to be substantially stationary, electrical means to pass a surge of current through the wire actuator, and friction means engageable with the shutter element to arrest its movement when the shutter element is actuated.

5. A high speed shutter mechanism as set forth in claim 4 in which said friction means includes a spring-loaded brakeshoe and a stationary abutment member extending into the path of movement of the shutter element.

6. A high speed shutter mechanism comprising a freely movable high speed shutter element having a light aperture, means to support and guide the shutter element during movement of the latter and having a light aperture for substantial instantaneous registration with the light aperture of the shutter, a current-conducting wire actuator for the shutter element disposed near one end of the shutter element and in unattached relation thereto and having opposed sides adapted to separate and propel said shutter element when said wire actuator is energized, electrical means to pass a surge of current through the wire actuator, a movable brakeshoe member and an immovable arresting member carried by said first mentioned means and extending into the path of movement of the shutter element and engageable therewith to arrest its movement when the shutter element is actuated, and spring means carried by said first mentioned means for maintaining said brakeshoe member and said arresting member in position.

7. A high speed shutter as set forth in claim 6, in which said movable brakeshoe member provides an inclined surface for contact with the shutter element.

8. A high speed shutter mechanism as set forth in claim 6 in which said spring means comprises a leaf spring mounted to said first mentioned means resiliently urging a seating block into contact with said brakeshoe member and said arresting member for maintaining the latter in position.

9. An electro-mechanical shutter for use with testing equipment comprising a wire element bent back upon itself to provide a pair of wire segments in close proximity to each other, an untethered slidable shutter plate positioned in abutment with one of the wire segments, said shutter plate carrying an aperture normally out of alignment with a coacting aperture provided by the testing equipment, an electrical circuit for passing a high current surge through said wire element, one of the wire segments being arranged to be substantially stationary and disposed to repel the other wire segment upon the receipt of a current surge and thereby forwardly propel said untethered shutter plate, passing said shutter aperture and the coacting aperture into and out of alignment for opening and closing said shutter.

10. An electro-mechanical shutter providing shutter openings in the microsecond range comprising an actuating wire element bent back upon itself to provide a pair of wire segments in side-by-side relation, one of said wire segments disposed to be repelled by the other of said wire segments, means for discharging a current surge through said actuating wire element, a free moving shutter plate disposed in unattached abutment with one of the wire segments, the other wire segment being arranged to be substantially stationary when energized, and said shutter plate disposed to be forwardly propelled by one of said wire segments upon the discharge of a current surge through said actuating wire element.

11. A high speed shutter comprising a freely movable untethered shutter plate, a pair of wires extending adjacent and transversely of the shutter and transversely of the line of movement of the shutter plate, said pair of wires being unattached to said shutter plate and adapted to separate quickly in response to a current surge in opposite directions in the wires and transmit a propelling force to said freely movable shutter plate, with one of the wires of said pair being arranged to be substantially stationary when a current surge is passed therethrough.

12. A high speed shutter mechanism for operating in the microsecond range comprising support means, a freely movable untethered shutter element, mutually parallel wires movable in response to a current surge in opposite directions therethrough and disposed in unattached relation adjacent to said shutter element, one of the wires disposed to propel said movable shutter element, another of said wires being arranged to be substantially stationary when the current surge is passed therethrough and means to arrest the movement of the shutter element.

13. A shutter mechanism for operating in the microsecond range comprising in combination, support means, a free movable shutter element engageable with the support means, wire means movably responsive to a current surge passed therethrough and positioned in transverse relation to the line of movemnet of the shutter element and disposed in unattached adjacent relation thereto to propel the shutter element when energized, and said wire means having a transverse portion arranged to be substantially stationary when energized.

References Cited in the file of this patent

UNITED STATES PATENTS

| | | |
|---|---|---|
| 366,947 | Fox | July 19, 1887 |
| 1,631,963 | Ives | June 14, 1927 |